(12) United States Patent
Chen et al.

(10) Patent No.: US 9,370,993 B2
(45) Date of Patent: Jun. 21, 2016

(54) HYBRID POWER DRIVING DEVICE FOR VEHICLE AND CONTROL METHOD THEREOF

(71) Applicant: Jilin University, Changchun, Jilin (CN)

(72) Inventors: Hong Chen, Jilin (CN); Bingzhao Gao, Jilin (CN); Lulu Guo, Jilin (CN); Qiong Liang, Jilin (CN); Yu Xiang, Jilin (CN)

(73) Assignee: Jilin University, Jilin (CN)

( * ) Notice: Subject to any disclaimer, the term of this patent is extended or adjusted under 35 U.S.C. 154(b) by 159 days.

(21) Appl. No.: 14/207,064

(22) Filed: Mar. 12, 2014

(65) Prior Publication Data

US 2014/0311284 A1    Oct. 23, 2014

(30) Foreign Application Priority Data

Apr. 18, 2013   (CN) .......................... 2013 1 0133785

(51) Int. Cl.
*B60K 6/547* (2007.10)
*B60W 20/00* (2016.01)
*B60K 6/48* (2007.10)
*F16H 3/089* (2006.01)
*F16H 37/04* (2006.01)

(52) U.S. Cl.
CPC .............. *B60K 6/547* (2013.01); *B60W 20/30* (2013.01); *B60K 2006/4825* (2013.01); *B60K 2006/4841* (2013.01); *B60W 2510/10* (2013.01); *F16H 3/089* (2013.01); *F16H 2037/045* (2013.01); *F16H 2200/0034* (2013.01); *F16H 2200/0039* (2013.01); *F16H 2200/0043* (2013.01); *F16H 2200/0052* (2013.01); *Y02T 10/6252* (2013.01); *Y10S 903/902* (2013.01); *Y10T 74/19014* (2015.01)

(58) Field of Classification Search
None
See application file for complete search history.

(56) References Cited

U.S. PATENT DOCUMENTS

| 6,018,198 | A | 1/2000 | Tsuzuki et al. | |
| 6,558,283 | B1 * | 5/2003 | Schnelle ............. | F16H 37/0826 180/65.235 |
| 6,679,796 | B2 | 1/2004 | Sugano | |
| 7,343,993 | B2 | 3/2008 | Dong et al. | |
| 2011/0073393 | A1 * | 3/2011 | Sasaki ................... | B60K 6/387 180/65.22 |
| 2012/0053011 | A1 * | 3/2012 | Onomura ............... | B60K 6/383 477/3 |
| 2012/0138405 | A1 * | 6/2012 | Falkenstein ............ | B60K 6/48 192/3.54 |

FOREIGN PATENT DOCUMENTS

| CN | 101417606 A | 4/2009 |
| CN | 102490588 A | 6/2012 |
| CN | 102700407 A | 10/2012 |

* cited by examiner

*Primary Examiner* — Justin Holmes
(74) *Attorney, Agent, or Firm* — Venable LLP; Henry J. Daley (57) ABSTRACT

This invention proposes a hybrid power driving device including an electric motor, an Internal Combustion engine, an automated mechanical transmission, a clutch, a main reducer and a differential, where the automated mechanical transmission includes first to sixth gear wheels forming meshing pairs, 2 synchronizers, an input transmission shaft connected with the engine, an input transmission shaft connected with the motor, and an output transmission shaft. This device provides for the motor with two gears, and provides for the engine with four gears, which can meet the practical demands of the engine and the motor. Compared with the existing parallel hybrid power coupling mechanism, the inventive device has a simple structure, a low cost, good shifting comfortability, and a high operation efficiency.

16 Claims, 4 Drawing Sheets

HYBRID POWER DRIVING DEVICE FOR VEHICLE AND CONTROL METHOD THEREOF

CROSS REFERENCE TO RELATED APPLICATIONS

This application claims the priority of Chinese Patent Application No. 201310133785.5 filed on Apr. 18, 2013, disclosure of which is incorporated herein by reference in its entirety.

TECHNICAL FIELD

This invention relates to a driving device of mobile machinery, and particularly to a hybrid power driving device for vehicle, and more particularly to a hybrid power driving device for plug-in hybrid electric vehicle.

BACKGROUND OF THE INVENTION

Due to the huge pressure of energy saving and environmental protection, energy-saving and environment-friendly products are developed in many automobile industries around the world. For example, a Chinese patent application No. CN102700407A has proposed an electrically-controlled 2-speed automated mechanical transmission (AMT) for a pure Electric Vehicle (EV). This 2-speed automated mechanical transmission has an advantage of high power transmission efficiency, without power interruption during shifting. Besides, compared with a pure electric vehicle with a single-speed transmission, the electric vehicle with such 2-speed automated transmission has been improved greatly in performances such as acceleration, grade ability and energy consumption economy.

However, due to the restriction of battery technologies, the driving range of the pure electric vehicle still cannot meet the demand for long-distance driving. The Hybrid Electric Vehicle (HEV), which is advantageous for an unchanged infrastructure, relatively mature technologies used and less pollution, has become a realistic option to solve energy and environment problems presently.

A Chinese patent application No. CN102490588A discloses a plug-in hybrid power driving mechanism, which employs two electric motors and one engine as power sources, to effectively utilize high-efficiency operation areas of the motors and engine. However, these two motors increase costs, thus such hybrid power driving mechanism is suitable for only business vehicles and multifunctional sport vehicles which are demanding for high power.

SUMMARY OF THE INVENTION

Based on the pure electric vehicle with an electrically-controlled 2-speed automated mechanical transmission as disclosed in Chinese patent application No. CN102700407A, the present invention proposes a hybrid power driving device with a single electric motor and an Internal Combustion (IC) engine for a plug-in hybrid electric vehicle, where a third drive shaft and 2×2 gear configuration are introduced, to couple the power of an engine, especially a small-displacement engine, through gear wheels as few as possible.

For mid-size passenger vehicles, studies have shown that an electric vehicle with a two-speed automated transmission fully utilizes the speed characteristics of the electric motor, and is superior to an electric vehicle with a single-speed transmission in terms of power and economy. Thus, the reasonable number of gears for the electric motor is two. Further, the electric motor functions to start the vehicle, so that the start-up gear (i.e. the 1st gear) of the automated transmission of the engine may be cancelled, as a result, the reasonable number of gears for the engine is four considering the fact that 6-speed transmission is popular for passenger cars at present.

The mechanism in this invention provides the motor with two gear ratios, and provides the engine with four gear ratios, which meets the practical requirement of the power coupling mechanism. Besides, the number of gear wheels used in the transmission is reduced and the axial dimension of the transmission is shortened. Compared with the hybrid power driving mechanism employing two electric motors as disclosed in Chinese patent application No. CN102490588A, the inventive device uses only one electric motor to reduce system costs, and therefore is more suitable for family cars.

In this invention, an engine and an electric motor are connected in parallel by an automated mechanical transmission, forming a parallel hybrid power coupling mechanism. Currently, there are many kinds of parallel hybrid power coupling mechanisms, such as an electrically-controlled automated manual transmission (AMT) (see U.S. Pat. No. 7,343,993B2), an automatic transmission (AT) with a wet clutch and a planetary gear (see US006018198A), and a continuously variable transmission (CVT) (see U.S. Pat. No. 6,679,796B2).

Compared with an existing parallel hybrid power coupling mechanism with the traditional AMT, where the motor is arranged at the front of the transmission (between the engine and the transmission), this invention eliminates the power interruption during the shifting of the AMT, while maintaining the high power transmission efficiency of the AMT. Further, compared with an existing parallel hybrid power coupling mechanism with the traditional AMT, where the motor is arranged at the end of the transmission (between the transmission and the differential), this invention provides 2 gear ratios for the motor to improve the power performance and economy in the pure electric driving mode. At the same time, no energy loss is caused in the invention by complicated mechanisms like the wet clutch and transmission belts in comparison with the existing parallel hybrid power coupling mechanism with the AT or CVT, thereby greatly improving the operation efficiency of the vehicle and reducing the cost.

In summary, compared with the existing parallel hybrid power coupling mechanism, the device proposed in this invention is advantageous for a high operation efficiency, a simple structure, a low cost as well as smooth shifting.

This invention aims to provide a compact hybrid power driving device with multiple driving modes and a gear shift function, and the device is applicable to plug-in hybrid electric passenger cars (especially front-engine front-wheel-drive cars), contains less pairs of meshing gear wheels and has a shorter axial dimension.

To solve the above technical problems, this invention proposes a hybrid power driving device including an engine, an electric motor, an automated mechanical transmission, a dual-plate dry clutch, a main reducer and a differential. The automated mechanical transmission contains a first gear wheel, a second gear wheel, a third gear wheel, a fourth gear wheel, a fifth gear wheel, a sixth gear wheel, a first synchronizer, a second synchronizer, a first input transmission shaft connected with the engine, a second input transmission shaft connected with the motor, and an output transmission shaft, where the first and second gear wheels form a pair of meshing gear wheels, the second and third gear wheels form a pair of meshing gear wheels, the fourth and fifth gear wheels form a pair of meshing gear wheels, and the fifth and sixth gear wheels form a pair of meshing gear wheels.

In the automated mechanical transmission, both the second and fifth gear wheels are centrally passed through by and fixed to the second input transmission shaft, both the third and fourth gear wheels are centrally passed through by and slidable longitudinally on the first input transmission shaft, and both the first and sixth gear wheels are centrally passed through by and slidable longitudinally on the output transmission shaft, thus forming a 2×2 gear ratio configuration. Here, the third and fourth gear wheels may be rotated freely relative to the first input transmission shaft, and the first and sixth gear wheels may be rotated freely relative to the output transmission shaft. The flywheel of the engine is connected with the first input transmission shaft by a torsion damper, and an output shaft of the electric motor is connected with the second input transmission shaft.

The main reducer is formed by a driving gear wheel and a driven gear wheel, and is connected with the differential.

The first synchronizer is configured to control the output transmission shaft and the first gear wheel to be engaged with or separated from each other, the second synchronizer is configured to control the first input transmission shaft and the third or fourth gear wheel to be engaged with or separated from each other, and the dual-plate dry clutch is configured to control the sixth gear wheel and the output transmission shaft to be engaged with or separated from each other.

The above automated mechanical transmission of the present invention provides 2 gears for the power output from the electric motor, and provides 4 gears for the power output from the engine.

By controlling the startup and stop of the engine, the power on and power off of the motor, and the related gear shifting, the switching between a pure electric driving mode and a hybrid driving mode can be realized.

The gear shifting of the transmission can be achieved by controlling the first synchronizer, the second synchronizer and the dual-plate dry clutch to be engaged with or separated from their corresponding gear wheels.

The second gear wheel includes two fixedly connected toothed wheels with different diameters, so that the quotient of speed ratios of two adjacent gears of the transmission is nearly equal to the quotient of speed ratios of any other two adjacent gears of the transmission.

The present invention further provides a method of controlling a hybrid power driving device for a vehicle, where the hybrid power driving device includes an engine, an electric motor, an automated mechanical transmission, a clutch, a main reducer and a differential. The automated mechanical transmission contains a first gear wheel, a second gear wheel, a third gear wheel, a fourth gear wheel, a fifth gear wheel, a sixth gear wheel, a first synchronizer, a second synchronizer, a first input transmission shaft connected with the engine, a second input transmission shaft connected with the motor, and an output transmission shaft, where the first and second gear wheels form a pair of meshing gear wheels, the second and third gear wheels form a pair of meshing gear wheels, the fourth and fifth gear wheels form a pair of meshing gear wheels, and the fifth and sixth gear wheels form a pair of meshing gear wheels.

In the automated mechanical transmission, both the second and fifth gear wheels are centrally passed through by and fixed to the second input transmission shaft, both the third and fourth gear wheels are centrally passed through by and slidable longitudinally on the first input transmission shaft, and both the first and sixth gear wheels are centrally passed through by and slidable longitudinally on the output transmission shaft. Here, the third and fourth gear wheels are rotatable relative to the first input transmission shaft, and the first and sixth gear wheels are rotatable relative to the output transmission shaft. The flywheel of the engine is connected with the first input transmission shaft by a torsion damper, and an output shaft of the electric motor is connected with the second input transmission shaft.

The main reducer is formed by a driving gear wheel and a driven gear wheel, and is connected with the differential. The first synchronizer is configured to control the output transmission shaft and the first gear wheel to be engaged with or separated from each other, the second synchronizer is configured to control the first input transmission shaft and the third or fourth gear wheel to be engaged with or separated from each other, and the clutch is configured to control the sixth gear wheel and the output transmission shaft to be engaged with or separated from each other.

The method includes controlling the first synchronizer, the second synchronizer and/or the clutch to be engaged with or separated from their corresponding gear wheels, to operate the hybrid power driving device in a pure electric driving mode, a hybrid driving mode, a braking mode, or a coasting mode without power.

The technical effects of this invention are as follows.

The device disclosed in the present invention has a simple and compact structure, a low cost and a short axial dimension, and hence is very suitable for the front-engine front-wheel-drive cars. Furthermore, the inventive device can effectively utilize the speed characteristics and the high efficiency areas of the engine and the electric motor, work in more driving modes, and eliminate the power interruption during the gear shifting process. Thus, the power performance and fuel economy of the vehicle can be improved.

The number of gears of the automated mechanical transmission varies with driving modes. When the vehicle is driven in the pure electric driving mode, the second synchronizer on the first input transmission shaft stays at the neutral position, and the shifting in the automated mechanical transmission is achieved by the first synchronizer and the dual-plate dry clutch. In this case, there are two effective gears, i.e. a low speed gear implemented through the second gear wheel and the first gear wheel engaged with each other, and a high speed gear implemented through the fifth gear wheel and the sixth gear wheel engaged with each other.

When the vehicle is driven in the hybrid driving mode, the engine is involved in providing power by the first input transmission shaft in addition to the electric motor on the basis of the pure electric driving mode. In this case, the second synchronizer on the first input transmission shaft is configured to provide two gears together with the third and fourth gear wheels at both sides of the second synchronizer, so that a 2×2 gear configuration (with total 4 gears) is formed considering those two gears achieved by the output transmission shaft at the pure electric driving mode. Therefore, four effective gears are provided by the automated mechanical transmission through the first synchronizer, the second synchronizer and the dual-plate dry clutch. Here, those four gears include a low speed gear with a high torque implemented by the engagement between the fourth and fifth gear wheels and the engagement between the second and first gear wheels, a normal low speed gear implemented by the engagement between the third and second gear wheels and the engagement between the second and first gear wheels, a high speed gear implemented by the engagement between the fourth and fifth gear wheels and the engagement between the fifth and sixth gear wheels, and an over speed gear implemented by the engagement between the third and second gear wheels and the engagement between the fifth and sixth gear wheels.

This invention provides two gears for the power output of the motor, and provides four gears for the power output of the engine, which can meet the practical work demand of the engine and the motor.

It should be understood that the gear numbers and the speed ratios can be varied as will, although it is presently assumed in this architecture that the suitable gear number for the electric motor is two and the suitable gear number for the IC engine is four in the case of mid-sized passenger cars.

In the process of gear shifting between two gear wheels which are associated with the second synchronizer on the first input transmission shaft, the torque interruption of the engine route can be compensated by the electric motor, which has a short-time overload capability. In the process of gear shifting between two gear wheels which are associated with the synchronizer on the output transmission shaft and the dual-plate dry clutch, respectively, seamless shifting without torque hole can be realized by the coordination control of the synchronizer and the dual-plate dry clutch. Thus, the device of the invention guarantees the drivability performance of the vehicle.

In this invention, the clutch of the traditional automated mechanical transmission is connected to the output transmission shaft, and the power of the engine is outputted to the automated mechanical transmission by the flywheel and the torsion damper directly without a clutch. The rotation speed synchronization of the engine at the time of gear shifting is achieved by an active engine speed control technology (e.g., controlling of the ignition advance angle, brake of the intake air, fuel cut-off and so on).

Because of the large span between two speed ratios of the gears for the electric motor, more frictional dissipation of clutch plates is generated when gear shifting. At the same time, the dry clutch is located behind the output transmission shaft, so that a larger torque will be needed for clutch slipping. Thus, in order to improve the torque and heat capacity of the dry clutch and reduce the axial dimension thereof, the device in this invention contains two friction plates. It should be understood, however, that any of a variety of plate numbers can be used as well.

According to this invention, the engine is started by the electric motor, thereby cancelling the traditional start electric motor for the engine. To start the engine, the second synchronizer is engaged with the third gear wheel, so that the first input transmission shaft connected with the engine is associated with the second input transmission shaft connected with the electric motor through the engagement between the third and second gear wheels, thus the engine is started by the motor. Because the power of the electric motor is much higher than that of the traditional start electric motor for the engine, the engine can be started quickly. Such start-up process of the engine is preferably implemented when the vehicle is travelling at a coasting speed or accelerating slowly.

When the electricity in the battery for the motor is sufficient (e.g., a state of charge (SOC) of the battery>0.5), the vehicle is driven in the pure electric driving mode. In this case, the automated mechanical transmission operates with two effective gears, so that the vehicle has much better power and economy performance than a vehicle with a single-gear gearbox. Because of the low average power requirement on a vehicle when the vehicle drives at an urban area, the pure electric driving mode can meet the driving requirements, including those on starting, accelerating, climbing and reversing.

When the state of charge of the battery is less than the minimum value (e.g., SOC<0.3), after the engine is started with the help of the electric motor, the engine begins to contribute to the output torque. As such, the power driving device of the invention is working in the hybrid driving mode and the automated mechanical transmission works with four effective gears. In this hybrid driving mode, the gear of the AMT is selected so that the engine works in its high efficiency area. If the power of the engine is insufficient for driving the vehicle, the driving mode is switched to an underpowered driving mode, and the engine outputs power together with the electric motor; if the power provided by the engine is more than the power demanded by the vehicle, the power driving device of the invention enters into an over-powered driving mode, in which merely the engine provides the required power and additionally drives the electric motor to generate electricity (that is, the motor works as a generator), to charge the battery. When the state of charge of the battery is more than the maximal value (e.g., SOC>0.8), the charging of the battery stops and the power driving device works in the pure electric driving mode again.

When the vehicle is braked or is coasting without driving power, the wheels of the vehicle drive the electric motor to generate electricity, to charge the battery for energy recovering. Because the electric motor can run in either a forward direction or a reverse direction, the vehicle equipped with the electric motor can run backward through the motor.

The reference numeral list is as follows.

| | | |
|---|---|---|
| 1: driven gear wheel of main reducer; | 2: half axle; | 3: first gear wheel |
| 4: first synchronizer; | 5: driving gear wheel of main reducer; | 8: third gear wheel; |
| 6: second gear wheel; | | 11: fourth gear wheel; |
| | | 14: fifth gear wheel; |
| | 7: electric motor; | 17: dual-plate dry clutch; |

-continued

9: first input transmission shaft;
10: second synchronizer
12: torsion damper;
13: engine
15: second input transmission shaft;
16: sixth gear wheel;
18: output transmission shaft;
19: differential;
20: seventh gear wheel;
21: eighth gear wheel.

DESCRIPTION OF THE PREFERRED EMBODIMENTS

The present invention will be described in detail with reference to the drawings and embodiments.

Figure 1:
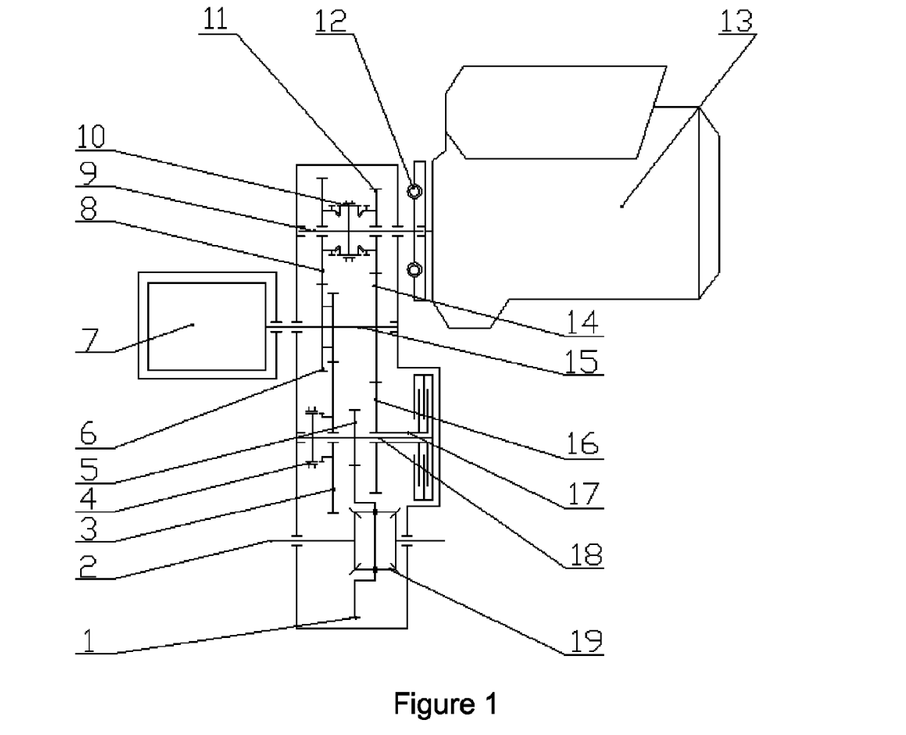
FIG. 1 is a schematic diagram showing the structure of a hybrid power driving device of this invention.

This invention proposes a compact hybrid power driving device based on an automated mechanical transmission for plug-in hybrid electric passenger cars, and the device includes an engine 13, an electric motor 7, an automated mechanical transmission, a dual-plate dry clutch 17, a main reducer and a differential 19. The automated mechanical transmission contains a first gear wheel 3, a second gear wheel 6, a third gear wheel 8, a fourth gear wheel 11, a fifth gear wheel 14, a sixth gear wheel 16, a first synchronizer 4, a second synchronizer 10, a first input transmission shaft 9 connected with the engine, a second input transmission shaft 15 connected with the motor, and an output transmission shaft 18, where the first and second gear wheels 3, 6 form a pair of meshing gear wheels, the second and third gear wheels 6, 8 form a pair of meshing gear wheels, the fourth and fifth gear wheels 11, 14 form a pair of meshing gear wheels, and the fifth and sixth gear wheels 14, 16 form a pair of meshing gear wheels.

In the automated mechanical transmission, both the second and fifth gear wheels 6, 14 are centrally passed through by and fixed to the second input transmission shaft 15, both the third and fourth gear wheels 8, 11 are centrally passed through by and slidable longitudinally on the first input transmission shaft 9, and both the first and sixth gear wheels 3, 16 are centrally passed through by and slidable longitudinally on the output transmission shaft 18. Here, the third and fourth gear wheels 8, 11 may be rotated freely relative to the first input transmission shaft 9, and the first and sixth gear wheels 3, 16 may be rotated freely relative to the output transmission shaft 18. The flywheel of the engine 13 is connected with the first input transmission shaft 9 by a torsion damper 12, and an output shaft of the electric motor 7 is connected with the second input transmission shaft 15. The main reducer is formed by a driving gear wheel 5 and a driven gear wheel 1, and is connected with the differential 19.

The first synchronizer 4 is configured to control the output transmission shaft 18 and the first gear wheel 3 to be engaged with or separated from each other, the second synchronizer 10 is configured to control the first input transmission shaft 9 and the third or fourth gear wheel 8, 11 to be engaged with or separated from each other, and the dual-plate dry clutch 17 is configured to control the sixth gear wheel 16 and the output transmission shaft 18 to be engaged with or separated from each other.

By controlling the startup and stop of the engine 13, the power on and power off of the motor 7, and the related gear shifting (e.g. the separation and engagement of the second synchronizer 10 and its associated gear wheels), the switching between the pure electric driving mode and the hybrid driving mode can be realized. The gear shifting of the transmission can be achieved by controlling the first synchronizer 4, the second synchronizer 10 and the dual-plate dry clutch 17 to be engaged with or separated from their associated gear wheels. The second gear wheel 6 includes two fixedly connected toothed wheels with different diameters, so that the quotient of speed ratios of two adjacent gears of the transmission is nearly equal to the quotient of speed ratios of any other two adjacent gears of the transmission.

The above automated mechanical transmission of the present invention provides 2 gears for the power output from the electric motor 7, and provides 4 gears for the power output from the engine 13.

It should be understood that any of a variety of gear numbers and speed ratios can be used as well, although it is presently assumed that in this architecture the suitable gear number for the electric motor is two and the suitable gear number for the IC engine is four for mid-size passenger cars.

When the vehicle is driven in the pure electric driving mode, the second synchronizer 10 on the first input transmission shaft 9 stays at the neutral position, and the shifting in the automated mechanical transmission is achieved by the first synchronizer 4 and the dual-plate dry clutch 17. In this case, there are two effective gears, i.e. a low speed gear implemented through the second gear wheel 6 and the first gear wheel 3 engaged with each other, and a high speed gear implemented through the fifth gear wheel 14 and the sixth gear wheel 16 engaged with each other.

When the vehicle is driven in the hybrid driving mode, the engine 13 is additionally involved in providing power by the first input transmission shaft 9, and four effective gears are provided by the automated mechanical transmission through the first synchronizer 4, the second synchronizer 10 and the dual-plate dry clutch 17. Here, those four gears include a low speed gear with a high torque implemented by the engagement between the fourth and fifth gear wheels 11, 14 and the engagement between the second and first gear wheels 6, 3, a normal low speed gear implemented by the engagement between the third and second gear wheels 8, 6 and the engagement between the second and first gear wheels 6, 3, a high speed gear implemented by the engagement between the fourth and fifth gear wheels 11, 14 and the engagement between the fifth and sixth gear wheels 14, 16, and an over speed gear implemented by the engagement between the third and second gear wheels 8, 6 and the engagement between the fifth and sixth gear wheels 14, 16.

Based on the engine and the motor that are coupled through the automated mechanical transmission, by the shifting of the automated mechanical transmission and the startup and stop of the engine 13 and the motor 7, this invention provides the following operation modes.

[Pure Electric Driving Mode]

Figure 2A:
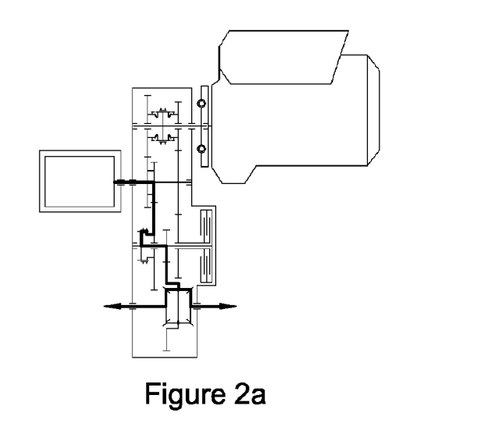
FIGS. 2a and 2b show the route of power transmission in the pure electric driving mode, and represent the cases of a low speed gear and a high speed gear, respectively.
Figure 2B:
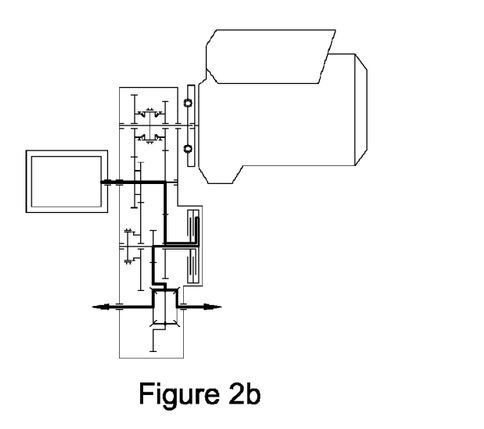

As shown in FIG. 2, when the electricity in the battery for the motor is sufficient (e.g., a state of charge (SOC) of the battery>0.5), this hybrid power driving device works in the pure electric driving mode, and the automated mechanical transmission operates with two effective gears, i.e. a low speed gear (as shown in FIG. 2a) and a high speed gear (as shown in FIG. 2b).

When the automated mechanical transmission operates in the low speed gear, the first synchronizer 4 is engaged with the first gear wheel 3, so that the first gear wheel 3 is fixedly connected with the output transmission shaft 18. At this time, the dual-plate dry clutch 17 is in a disengaged state, and the sixth gear wheel 16 rotates freely. In this case, the route of power transmission is that: the power is initially outputted from the electric motor 7, and sequentially passed through the second input transmission shaft 15, the second gear wheel 6, the first gear wheel 3, the first synchronizer 4, the output transmission shaft 18, the driving gear wheel 5 of the main reducer, the driven gear wheel 1 of the main reducer, and the differential 19, to the half axle 2.

When the automated mechanical transmission operates in the high speed gear, the first synchronizer 4 is not engaged with the first gear wheel 3 so that the first gear wheel 3 rotates freely, and the dual-plate dry clutch 17 is in an engaged state so that the sixth gear wheel 16 is fixedly connected with the output transmission shaft 18 by the clutch 17. Further, the route of power transmission is that: the power is initially transmitted from the electric motor 7, and sequentially passed through the second input transmission shaft 15, the fifth gear wheel 14, the sixth gear wheel 16, the dual-plate dry clutch 17, the output transmission shaft 18, the driving gear wheel 5 of the main reducer, the driven gear wheel 1 of the main reducer, and the differential 19, to the half axle 2.

Because the speed ratios have been optimized for those two gears of the automated mechanical transmission in the pure electric driving mode to improve the operation efficiency of the motor, the vehicle with the inventive hybrid power driving device has better power and economy performances than a vehicle with an automated mechanical transmission having a single gear. Because of the low power requirement on a vehicle when the vehicle drives at an urban area, the pure electric driving mode can meet the driving requirements, including those on starting, accelerating, climbing and reversing. Furthermore, the gear shifting is implemented without power interruption through the cooperation between the first synchronizer 4 and the dual-plate dry clutch 17, so that the quality of the gear shifting is improved, and the vehicle drives smoother. Because the electric motor 7 can run in either a forward direction or a reverse direction by inputting a positive or negative voltage, the vehicle equipped with the electric motor 7 can run backward in the pure electric driving mode when the motor 7 rotates reversely.

[Hybrid Driving Mode]

When the state of charge of the battery is less than the minimum value (e.g., SOC<0.3), after the engine 13 is started at the help of the electric motor 7, the engine 13 begins to contribute to the output torque, thus the hybrid power driving device is working in the hybrid driving mode. If the actual output power of the engine 13 cannot meet the power requirement of the vehicle, the hybrid power driving device works in the underpowered driving mode; on the contrary, if the power provided by the engine 13 is more than that as required by the vehicle, the hybrid power driving device works in the overpowered driving mode. These modes are particularly described below.

—Hybrid Driving Mode 1: Underpowered Driving Mode

As shown in FIG. 3, if the engine 13 is forced to work in its high efficiency area when the vehicle is in the process of urgent accelerating or climbing, the power of the engine 13 cannot meet the power requirement of the vehicle at this time, as such, the hybrid power driving device works in the underpowered driving mode, and the electric motor 7 and the engine 13 simultaneously provide the power required by the vehicle. The automated mechanical transmission works with four effective gears, i.e. a low speed gear with a high torque, a normal low speed gear, a high speed gear and an over speed gear.

Figure 3A:
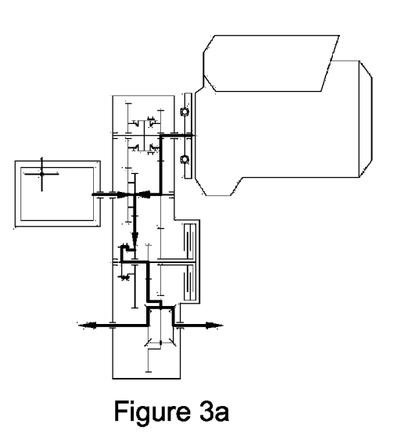
FIGS. 3a, 3b, 3c and 3d show the route of power transmission in the underpowered driving mode, and represent the cases of a low speed gear with a high torque, a normal low speed gear, a high speed gear and an over speed gear, respectively.

When the automated mechanical transmission works in the low speed gear with a high torque (as shown in FIG. 3a), the second synchronizer 10 is locked with the fourth gear wheel 11 so that the fourth gear wheel 11 is fixedly connected with the first input transmission shaft 9 and the third gear wheel 8 rotates freely; the first synchronizer 4 is locked with the first gear wheel 3 so that the first gear wheel 3 is fixedly connected with the output transmission shaft 18; and the dual-plate dry clutch 17 is in its disengaged state so that the sixth gear wheel 16 rotates freely. Then, the route of power transmission is that: the power outputted from the engine 13 is passed through the torsion damper 12, the first input transmission shaft 9, the second synchronizer 10, the fourth gear wheel 11, the fifth gear wheel 14, the second input transmission shaft 15, the second gear wheel 6, the first gear wheel 3, the first synchronizer 4, the output transmission shaft 18, the driving gear wheel 5 of the main reducer, the driven gear wheel 1 of the main reducer, and the differential 19, to the half axle 2; while the power outputted from the electric motor 7 is passed through the second input transmission shaft 15, the second gear wheel 6, the first gear wheel 3, the first synchronizer 4, the output transmission shaft 18, the driving gear wheel 5 of the main reducer, the driven gear wheel 1 of the main reducer, and the differential 19, to the half axle 2. Such low speed gear with a high torque is suitable for urgent accelerating and climbing of the vehicle.

Figure 3B:
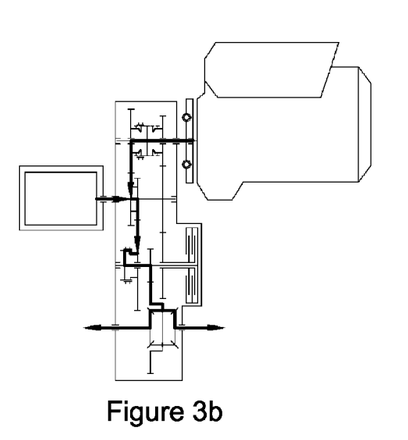

When the automated mechanical transmission works in the normal low speed gear (as shown in FIG. 3b), the second synchronizer 10 is locked with the third gear wheel 8 so that the third gear wheel 8 is fixedly connected with the first input transmission shaft 9 and the fourth gear wheel 11 rotates freely; the first synchronizer 4 is locked with the first gear wheel 3 so that the first gear wheel 3 is fixedly connected with the output transmission shaft 18; and the dual-plate dry clutch 17 works in its disengaged state and the sixth gear wheel 16 rotates freely. At this time, the route of power transmission is that: the power outputted from the engine 13 is passed through the torsion damper 12, the first input transmission shaft 9, the second synchronizer 10, the third gear wheel 8, the second gear wheel 6, the first gear wheel 3, the first synchronizer 4, the output transmission shaft 18, the driving gear wheel 5 of the main reducer, the driven gear wheel 1 of the main reducer, and the differential 19, to the half axle 2; while the power outputted from the electric motor 7 is passed through the second input transmission input 15, the second gear wheel 6, the first gear wheel 3, the first synchronizer 4, the output transmission shaft 18, the driving gear wheel 5 of the main reducer, the driven gear wheel 1 of the main reducer, and the differential 19, to the half axle 2. Such normal low speed gear is suitable for climbing on a long slope at a low speed, or urgent accelerating at a low speed.

Figure 3C:
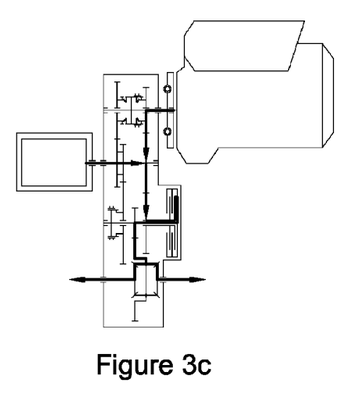

When the automated mechanical transmission works in the high speed gear (as shown in FIG. 3c), the second synchronizer 10 is locked with the fourth gear wheel 11 so that the fourth gear wheel 11 is fixedly connected with the first input transmission shaft 9 and the third gear wheel 8 rotates freely; the first synchronizer 4 is disengaged with the first gear wheel 3 so that the first gear wheel 3 rotates freely; and the dual-plate dry clutch 17 is in its engaged state so that the sixth gear wheel 16 is fixedly connected with the output transmission shaft 18. At this time, the route of power transmission is that: the power outputted from the engine 13 is passed through the torsion damper 12, the first input transmission shaft 9, the second synchronizer 10, the fourth gear wheel 11, the fifth gear wheel 14, the sixth gear wheel 16, the dual-plate dry clutch 17, the output transmission shaft 18, the driving gear wheel 5 of the main reducer, the driven gear wheel 1 of the main reducer, and the differential mechanism 19, to the half axle 2; while the power outputted from the electric motor 7 is passed through the second input transmission shaft 15, the fifth gear wheel 14, the sixth gear wheel 16, the dual-plate dry clutch 17, the output transmission shaft 18, the driving gear wheel 5 of the main reducer, the driven gear wheel 1 of the main reducer, and the differential mechanism 19, to the half axle 2.

Figure 3D:
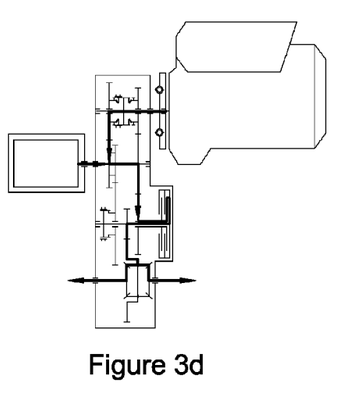

When the automated mechanical transmission works in the over speed gear (as shown in FIG. 3d), the second synchronizer 10 is locked with the third gear wheel 8 so that the third gear wheel 8 is fixedly connected with the first input transmission shaft 9 and the fourth gear wheel 11 rotates freely; the first synchronizer 4 is disengaged with the first gear wheel 3 so that the first gear wheel 3 rotates freely; and the dual-plate dry clutch 17 is in its engaged state so that the sixth gear wheel 16 is fixedly connected with the output transmission shaft 18. At this time, the route of power transmission is that: the power outputted from the engine 13 is passed through the torsion damper 12, the first input transmission shaft 9, the second synchronizer 10, the third gear wheel 8, the second gear wheel 6, the second input transmission shaft 15, the fifth gear wheel 14, the sixth gear wheel 16, the dual-plate dry clutch 17, the output transmission shaft 18, the driving gear wheel 5 of the main reducer, the driven gear wheel 1 of the main reducer, and the differential 19, to the half axle 2; while the power outputted from the electric motor 7 is passed through the second input transmission shaft 15, the fifth gear wheel 14, the sixth gear wheel 16, the dual-plate dry clutch 17, the output transmission shaft 18, the driving gear wheel 5 of the main reducer, the driven gear wheel 1 of the main reducer, and the differential 19, to the half axle 2.

—Hybrid Driving Mode 2: Over-Powered Driving Mode

Figure 4A:
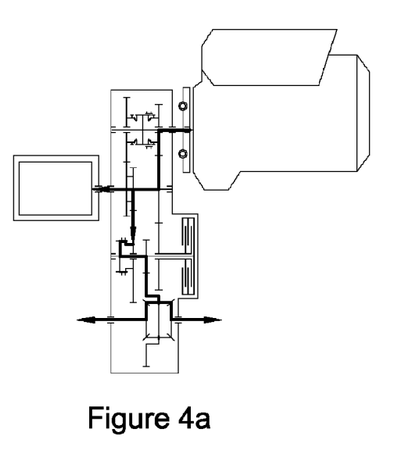
FIGS. 4a, 4b, 4c and 4d show the route of power transmission in the over-powered driving mode, and represent the cases of a low speed gear with a high torque, a normal low speed gear, a high speed gear and an over speed gear, respectively.
Figure 4B:
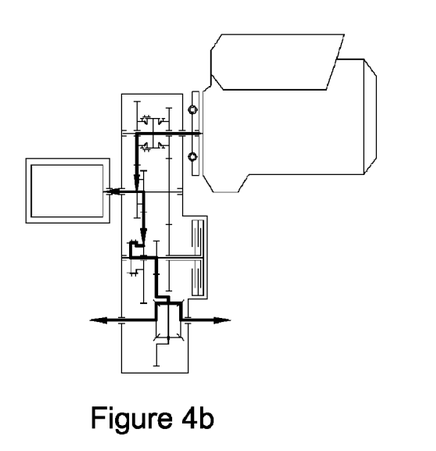

As shown in FIGS. 4a and 4b, when the vehicle drives steadily on a flat road with a uniform velocity, if the engine works in its high efficiency area, the power outputted from only the engine is sufficient or even more than the power required for the driving of the vehicle, as such, the hybrid power driving device enters the over-powered driving mode, in which only the engine provides the power required by the vehicle and additionally drives the electric motor (working as generator) to generate electricity, to charge the battery of the vehicle. When the state of charge of the battery is more than a high value (e.g., SOC>0.8), the charging of the battery stops, and the vehicle drives in the pure electric driving mode again. The routes of power transmission in this over-powered driving mode are as follows.

When the automated mechanical transmission works in the low speed with a high torque (as shown in FIG. 4a), the second synchronizer 10 is locked with the fourth gear wheel 11 so that the fourth gear wheel 11 is fixedly connected with the first input transmission shaft 9 and the third gear wheel 8 rotates freely; the first synchronizer 4 is locked with the first gear wheel 3 so that the first gear wheel 3 is fixedly connected with the output transmission shaft 18; and the dual-plate dry clutch 17 is in its disengaged state so that the sixth gear wheel 16 rotates freely. At this time, the route of power transmission is that: the power is outputted from the engine 13 and is passed through the torsion damper 12, the first input transmission shaft 9, the second synchronizer 10, the fourth gear wheel 11, and the fifth gear wheel 14, to the second input transmission shaft 15. In this case, a part of the power is used for driving the vehicle and is outputted to the half axle 2 through the second gear wheel 6, the first gear wheel 3, the first synchronizer 4, the output transmission shaft 18, the driving gear wheel 5 of the main reducer, the driven gear wheel 1 of the main reducer, and the differential 19; and the remaining power flows into the electric motor 7 through the second input transmission shaft 15 to drive the motor 7 to generate electricity.

When the automated mechanical transmission works in the normal low speed gear (as shown in FIG. 4b), the second synchronizer 10 is locked with the third gear wheel 8 so that the third gear wheel 8 is fixedly connected with the first input transmission shaft 9 and the fourth gear wheel 11 rotates freely; the first synchronizer 4 is locked with the first gear wheel 3 so that the first gear wheel 3 is fixedly connected with the output transmission shaft 18; and the dual-plate dry clutch 17 is in its disengaged state so that the sixth gear wheel 16 rotates freely. At this time, the route of power transmission is that: the power is outputted from the engine 13 and passed through the torsion damper 12, the first input transmission shaft 9, the second synchronizer 10, and the third gear wheel 8, to the second gear wheel 6. In this case, a part of the power outputted from the engine 13 is used for driving the vehicle and is outputted to the half axle 2 through the second gear wheel 6, the first gear wheel 3, the first synchronizer 4, the output transmission shaft 18, the driving gear wheel 5 of the main reducer, the driven gear wheel 1 of the main reducer, and the differential 19; and the remaining power flows into the electric motor 7 through the second gear wheel 6 and the second input transmission shaft 15, to drive the motor 7 to generate electricity.

Figure 4C:
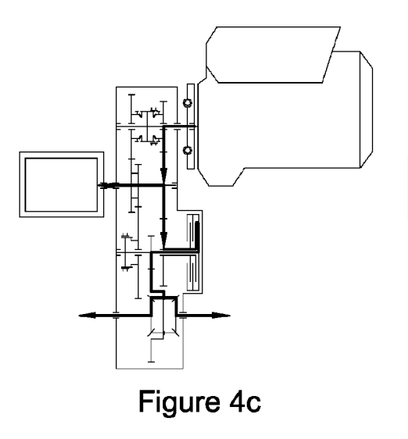

When the automated mechanical transmission works in the high speed gear (as shown in FIG. 4c), the second synchronizer 10 is locked with the fourth gear wheel 11 so that the fourth gear wheel 11 is fixedly connected with the first input transmission shaft 9 and the third gear wheel 8 rotates freely; the first synchronizer 4 is disengaged with the first gear wheel 3 so that the first gear wheel 3 rotates freely; and the dual-plate dry clutch 17 is in its engaged state so that the sixth gear wheel 16 is fixedly connected with the output transmission shaft 18. At this time, the route of power transmission is that: the power is outputted from the engine 13 and passed through the torsion damper 12, the first input transmission shaft 9, the second synchronizer 10, and the fourth gear wheel 11, to the fifth gear wheel 14. As such, a part of the power outputted from the engine 13 is used for driving the vehicle and is outputted to the half axle 2 through the fifth gear wheel 14, the sixth gear wheel 16, the dual-plate dry clutch 17, transmission the output shaft 18, the driving gear wheel 5 of the main reducer, the driven gear wheel 1 of the main reducer, and the differential 19; and the remaining power flows into the electric motor 7 through the fifth gear wheel 14 and the second input transmission shaft 15, to drive the motor 7 to generate electricity.

Figure 4D:
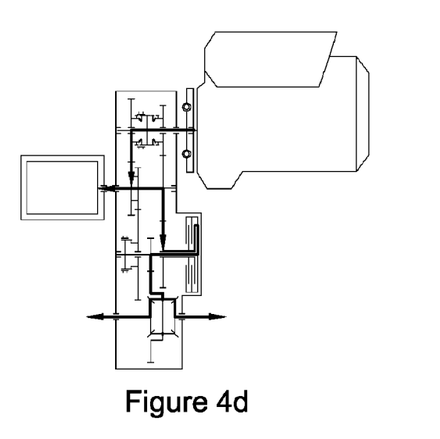

When the automated mechanical transmission works in an over speed gear (as shown in FIG. 4d), the second synchronizer 10 is locked with the third gear wheel 8, so that the third gear wheel 8 is fixedly connected with the first input transmission shaft 9 and the fourth gear wheel 11 rotates freely; the first synchronizer 4 is disengaged with the first gear wheel 3 so that the first gear wheel 3 rotates freely; and the dual-plate dry clutch 17 is in its engaged state so that the sixth gear wheel 16 is fixedly connected with the output transmission shaft 18. At this time, the route of power transmission is that: the power is outputted from the engine 13 and passed through the torsion damper 12, the first input transmission shaft 9, the second synchronizer 10, the third gear wheel 8, the second gear wheel 6, to the second input transmission shaft 15. As such, a part of the power outputted from the engine 13 is used for driving the vehicle and outputted to the half axle 2 through the fifth gear wheel 14, the sixth gear wheel 16, the dual-plate dry clutch 17, the output transmission shaft 18, the driving gear wheel 5 of the main reducer, the driven gear wheel 1 of the main reducer, and the differential 19; and the remaining power flows into the electric motor 7 through the second input transmission shaft 15, to drive the motor 7 to generate electricity.

[Braking Mode]

Figure 5:
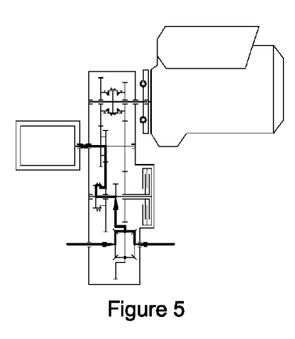
FIG. 5 shows the route of power transmission in the braking mode.

As shown in FIG. 5, when the brake pedal of the vehicle is pushed by the driver, the car is shifted to the braking mode, in which the second synchronizer 10 stays at the neutral position, and no power is outputted from either the engine 13 or the electric motor 7. Because of inertia of the vehicle, the electric motor 7 is driven by the vehicle wheels through a transmission system to generate electricity, which is used to charge the battery of the vehicle. When the car is braked, the second synchronizer 10 is controlled to stay at the neutral position, the first synchronizer 4 is locked with the first gear wheel 3 and the dual-plate dry clutch 17 is in its disengaged state. At this time, the route of power transmission is that: power is transmitted to the half axle 2 from vehicle wheels, and further to the electric motor 7 through the differential 19, the driven gear wheel 1 of the main reducer, the driving gear wheel 5 of the main reducer, the output transmission shaft 18, the first synchronizer 4, the first gear wheel 3, the second gear wheel 6, and the second input transmission shaft 15, to drive the motor 7 to generate electricity, to charge the battery. Further, the gear ratio between the second gear wheel 6 and the first gear wheel 3 makes better use of the drag torque of the electric motor 7 to enhance the braking effect, compared to the gear ratio between the fifth gear wheel 14 and the sixth gear wheel 16.

[Coasting Mode]

Figure 6:
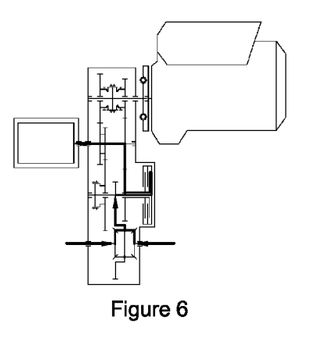
FIG. 6 shows the route of power transmission in the coasting mode.

As shown in FIG. 6, when the vehicle is coasting downhill, the driver releases the accelerator pedal and thus the vehicle coasts without power, in this case, the hybrid power driving device enters into a costing mode. As such, the second synchronizer 10 stays at the neutral position, and no power is outputted from either the engine 13 or the electric motor 7. Similarly, because of inertia of the vehicle, the electric motor 7 is driven by the vehicle wheels through a transmission system to generate electricity, which is used to charge the battery of the vehicle. The first synchronizer 4 is separated from the first gear wheel 3 and the dual-plate dry clutch 17 is engaged. In this mode, the route of power transmission is that: power is transmitted to the half axle 2 from vehicle wheels, and further to the electric motor 7 through the differential 19, the driven gear wheel 1 of the main reducer, the driving gear wheel 5 of the main reducer, the output transmission shaft 18, the dual-plate dry clutch 17, the sixth gear wheel 16, the fifth gear wheel 14, and the second input transmission shaft 15, to drive the motor 7 to generate electricity, which is used to charge the battery. Further, the gear ratio between the fifth gear wheel 14 and the sixth gear wheel 16 reduces the influence of the drag torque of the motor 7 on the coasting, to make the vehicle coast a longer distance compared to the gear ratio between the second gear wheel 6 and the first gear wheel 3.

It is possible to switch between any two of the above modes including: the pure electric driving mode, the hybrid driving mode (including the underpowered driving mode and the over-powered driving mode), the braking mode, and the coasting mode.

Here, the switching from the pure electric driving mode to the hybrid driving mode is taken as an example to introduce the process of mode switching. Particularly, when the electricity of the battery is sufficient (e.g., the state of charge (SOC) of the battery>0.5), the vehicle works in the pure electric driving mode, in which the power needed to drive the vehicle is provided by the electric motor 7 only, as shown in FIG. 2. When the state of charge of the battery is less than a certain lower threshold (e.g., SOC<0.3), the engine should be started and the mode should be switched into the hybrid driving model.

At beginning, the torque of the motor 7 is reduced to zero, and the gear for the motor 7 is disengaged (i.e., if the motor works in a low speed gear, the first synchronizer 4 is disengaged, and if the motor works in a high speed gear, the clutch 17 is disengaged). Then, the motor 7 stops, and the second synchronizer 10 can be locked with the third or fourth gear wheel 8 or 11. Whether the third gear wheel 8 or the fourth gear wheel 11 is locked depends on the present vehicle speed, the depth by which the acceleration pedal has been pressed, and the speed at which the acceleration pedal is pressed. After the second synchronizer 10 is engaged, the engine is started by the torque from the electric motor 7. Then the motor 7 and the engine 13 rotate together to achieve the target speed through the engagement of the first synchronizer 4 or the dual-plate dry clutch 17 (e.g., if the motor should work in a low speed gear, the first synchronizer 4 is disengaged, and if the motor should work in a high speed gear, the clutch 17 is disengaged). After the first synchronizer 4 or dual-plate dry clutch 17 is engaged, the engine 13 and the motor 7 begin to deliver their required power, and the vehicle enters into the hybrid driving mode. Because the duration of this mode switching process is controlled to be as short as possible, and it is controlled that such process does not happen in quick accelerating maneuver, the mode switching does not affect the driving comfortability significantly.

The driving modes and the switching therebetween in this invention has been described as above. In the following, the process of gear shifting will be described.

[The Gear Shifting Process]

When the hybrid power driving device works in the pure electric driving mode, the second synchronizer 10 stays at the neutral position, and the automated mechanical transmission shifts by the first synchronizer 4 and the dual-plate dry clutch 17. At this time, the automated mechanical transmission operates with two effective gears, i.e. a low speed gear (as shown in FIG. 2a) and a high speed gear (as shown in FIG. 2b). The process of shifting from the low speed gear to the high speed gear is that: firstly, the dual-plate dry clutch 17 is engaged gradually, as such, because of the friction between the friction sheet and the pressure plate, the torque transmitted by the dual-plate dry clutch 17 will increase gradually, and the torque transmitted by the first synchronizer 4 will decrease gradually; when the torque transmitted by the first synchronizer 4 is reduced to zero, the first synchronizer 4 will be actuated to be disengaged from the first gear wheel 3. Then, the dual-plate dry clutch 17 continuously moves to its engaged state until it is locked up, thus the process of shifting from the low speed gear to the high speed gear is finished.

The process of shifting from the high speed gear to the low speed gear is that: first, the dual-plate dry clutch 17 will be disengaged gradually, as such, because the friction between the friction sheet and the pressure plate is decreasing, a relative sliding motion happens between the friction sheet and the pressure plate, so that the torque transmitted through the dual-plate dry clutch 17 is decreasing gradually. Further, under the traction of the motor 7, the rotational speeds of the sixth gear wheel 16, the second input transmission shaft 15 and the first gear wheel 3 will increase, and at the same time the rotational speed of the output transmission shaft 18 does not change greatly because of the large inertia of the vehicle. When the speed of the first gear wheel 3 reaches to the speed of the output transmission shaft 18 which is connected with the first synchronizer 4, the first synchronizer 4 is engaged with the first gear wheel 3 and the dual-plate dry clutch 17 continues to move to its disengaged state until the end of the disengagement. At this time, the process of shifting is finished.

It can be seen that during the shift in the pure electric driving mode, there is no traction interruption of traditional automated manual transmission, which guarantees the drivability of the vehicle.

When the vehicle drives in the hybrid driving mode, the automated mechanical transmission shifts by the first synchronizer 4, the second synchronizer 10 and the dual-plate dry clutch 17 with four gears, that is, the low speed gear with a high torque, the normal low speed gear, the high speed gear and the over speed gear.

Because the shifting processes are similar, the process of shifting from the low speed gear (as shown in FIG. 4*b*) to the high speed gear (as shown in FIG. 4*c*) under the over-powered driving mode is taken as an example to introduce the shifting process in the hybrid driving mode.

First, the output torque of the engine 13 is reduced, and when there is no torque passed, the second synchronizer 10 is separated from the third gear wheel 8. At the same time, the output torque of the motor 7 is increased to compensate the falling of torque from the engine 13.

Then dual-plate dry clutch 17 is engaged gradually. Because of the friction between the friction sheet and the pressure plate, the torque transmitted by the dual-plate dry clutch 17 will increase gradually, and at the same time, the torque transmitted by first synchronizer 4 will decrease gradually. When there is no torque transmitted from the first synchronizer 4, the first synchronizer 4 is separated from the first gear wheel 3. Then, the dual-plate dry clutch 17 continues to moves to its engaged state until it is locked up. At the same time, the rotational speed of the engine 13 is controlled to tracking the speed of the fourth gear wheel 11. When the rotational speeds of the engine 13 and the fourth gear wheel 11 are nearly equal, the second synchronizer 10 is locked with the fourth gear wheel 11 rapidly and the engine 13 begins to deliver a traction torque.

Finally the motor 7 and the engine 13 are controlled to output their traction torques required by the under over-powered driving mode, and the gear shifting from the low speed gear (as shown in FIG. 4*b*) to the high speed gear (as shown in FIG. 4*c*) under the over-powered driving mode is finished.

It can be seen that during the shift in the hybrid driving mode, there is no traction interruption happens, which guarantees the drivability of the vehicle.

Although the preferred embodiment of the invention has been described as above, it will be apparent to those skilled in the art that the gear number can be varied, for example, be increased.

Figure 7:
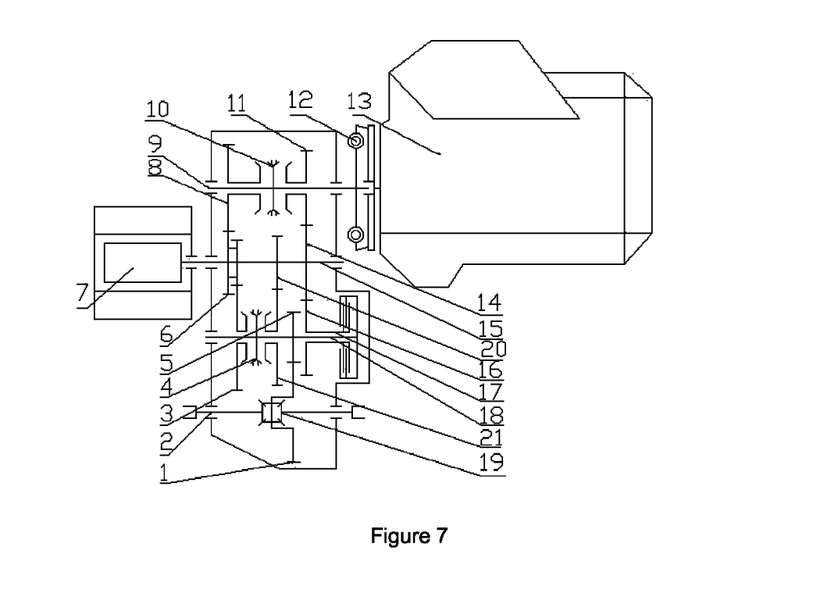
FIG. 7 is a schematic diagram showing a variant of the hybrid power driving device shown in FIG. 1, where a new pair of meshing gear wheels is added on the second input transmission shaft, and the first synchronizer is disposed between the pair of meshing gear wheels 3 and 6, so that 3 gears are provided for the power output from the electric motor 7, and 6 gears are provided for the power output from the engine 13.

As shown in FIG. 7, a variant of the hybrid power driving device shown in FIG. 1 is provided, to provide 3 gears for the motor and 6 gears for the engine. The compact hybrid power driving device based on an automated mechanical transmission for plug-in hybrid electric passenger cars as shown in FIG. 7 includes an engine 13, an electric motor 7, an automated mechanical transmission, a dual-plate dry clutch 17, a main reducer and a differential 19. The automated mechanical transmission contains a first gear wheel 3, a second gear wheel 6, a third gear wheel 8, a fourth gear wheel 11, a fifth gear wheel 14, a sixth gear wheel 16, a seventh gear wheel 20, an eighth gear wheel 21, a first synchronizer 4, a second synchronizer 10, a first input transmission shaft 9 connected with the engine, a second input transmission shaft 15 connected with the motor, and an output transmission shaft 18, where the first and second gear wheels 3, 6 form a pair of meshing gear wheels, the second and third gear wheels 6, 8 form a pair of meshing gear wheels, the fourth and fifth gear wheels 11, 14 form a pair of meshing gear wheels, the fifth and sixth gear wheels 14, 16 form a pair of meshing gear wheels, and the seventh and eighth gear wheels 20, 21 form a pair of meshing gear wheels.

In the automated mechanical transmission shown in FIG. 7, the second, fifth and seventh gear wheels 6, 14, 20 are centrally passed through by and fixed to the second input transmission shaft 15, both the third and fourth gear wheels 8, 11 are centrally passed through by and slidable longitudinally on the first input transmission shaft 9, and the first, sixth and eighth gear wheels 3, 16, 21 are centrally passed through by and slidable longitudinally on the output transmission shaft 18. Here, the third and fourth gear wheels 8, 11 may be rotated freely relative to the first input transmission shaft 9, and the first, sixth and eighth gear wheels 3, 16, 21 may be rotated freely relative to the output transmission shaft 18. The flywheel of the engine 13 is connected with the first input transmission shaft 9 by a torsion damper 12, and an output shaft of the electric motor 7 is connected with the second input transmission shaft 15. The main reducer is formed by a driving gear wheel 5 and a driven gear wheel 1, and is connected with the differential 19.

The first synchronizer 4 is configured to control the output transmission shaft 18 and the first and eighth gear wheels 3, 21 to be engaged with or separated from each other, the second synchronizer 10 is configured to control the first input transmission shaft 9 and the third or fourth gear wheel 8, 11 to be engaged with or separated from each other, and the dual-plate dry clutch 17 is configured to control the sixth gear wheel 16 and the output transmission shaft 18 to be engaged with or separated from each other.

Obviously, various modifications and variations can be made to the present invention by those skilled in the art without departing from the spirit and scope of the present invention. Thus, if the modifications and variations to the present invention fall in the scope of the appended claims and their equivalents of the present invention, the present invention is also intended to cover these modifications and variations.

The invention claimed is:

1. A hybrid power driving device for a vehicle, comprising an engine (13), an electric motor (7), an automated mechanical transmission, a clutch (17), a main reducer and a differential (19), wherein, the automated mechanical transmission comprises a first gear wheel (3), a second gear wheel (6), a third gear wheel (8), a fourth gear wheel (11), a fifth gear wheel (14), a sixth gear wheel (16), a first synchronizer (4), a second synchronizer (10), a first input transmission shaft (9) connected with the engine (13), a second input transmission shaft (15) connected with the motor (7), and an output transmission shaft (18), wherein the first and second gear wheels (3, 6) form a pair of meshing gear wheels, the second and third gear wheels (6, 8) form a pair of meshing gear wheels, the fourth and fifth gear wheels (11, 14) form a pair of meshing gear wheels, and the fifth and sixth gear wheels (14, 16) form a pair of meshing gear wheels, both the second and fifth gear wheels (6, 14) are centrally passed through by and fixed to the second input transmission shaft (15), both the third and fourth gear wheels (8, 11) are centrally passed through by and slidable longitudinally on the first input transmission shaft (9), and both the first and sixth gear wheels (3, 16) are centrally passed through by and slidable longitudinally on the output transmission shaft (18); the third and fourth gear wheels (8, 11) are rotatable freely relative to the first input transmission shaft (9), and the first and sixth gear wheels (3, 16) are rotatable freely relative to the output transmission shaft (18); a flywheel of the engine (13) is connected with the first input transmission shaft (9) by a torsion damper (12), and an output shaft of the electric motor (7) is connected with the second input transmission shaft (15);

the main reducer is formed by a driving gear wheel (5) and a driven gear wheel (1), and is connected with the differential (19);

the first synchronizer (4) is configured to control the output transmission shaft (18) and the first gear wheel (3) to be engaged with or separated from each other, the second synchronizer (10) is configured to control the first input transmission shaft (9) and the third or fourth gear wheel (8, 11) to be engaged with or separated from each other, and the clutch (17) is configured to control the sixth gear wheel (16) and the output transmission shaft (18) to be engaged with or separated from each other.

2. The device of claim 1, wherein, the automated mechanical transmission provides 2 gears for the power output from the electric motor (7), and provides 4 gears for the power output from the engine (13);

by controlling the startup and stop of the engine (13), the power on and power off of the motor (7), and the separation and engagement of the second synchronizer (10) and its associated gear wheels, the switching between a pure electric driving mode and a hybrid driving mode is realized;

the gear shifting of the automated mechanical transmission is achieved by controlling the first synchronizer (4), the second synchronizer (10) and the clutch (17) to be engaged with or separated from their associated gear wheels;

the second gear wheel (6) comprises two fixedly connected toothed wheels with different diameters, so that the quotient of speed ratios of two adjacent gears of the transmission is nearly equal to the quotient of speed ratios of any other two adjacent gears of the transmission.

3. The hybrid power driving device of claim 1, wherein, when the hybrid power driving device operates in the pure electric driving mode, the automated mechanical transmission is configured to operate with two effective gears, a low speed gear and a high speed gear, when the automated mechanical transmission operates in the low speed gear, the first synchronizer (4) is engaged with the first gear wheel (3), so that the first gear wheel (3) is fixedly connected with the output transmission shaft (18), at this time, the clutch (17) is in a disengaged state, and the sixth gear wheel (16) rotates freely; the route of power transmission is that: the power is outputted from the electric motor (7), and sequentially passed through the second input transmission shaft (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2);

when the automated mechanical transmission operates in the high speed gear, the first synchronizer (4) is not engaged with the first gear wheel (3) so that the first gear wheel (3) rotates freely, and the clutch (17) is in an engaged state so that the sixth gear wheel (16) is fixedly connected with the output transmission shaft (18), and the route of power transmission is that: the power is outputted from the electric motor (7), and sequentially passed through the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential (19), to the half axle (2).

4. The hybrid power driving device of claim 3, wherein, in the hybrid driving mode, if the actual output power of the engine (13) cannot meet the power requirement of the vehicle, the hybrid power driving device works in an underpowered driving mode; and if the power provided by the engine (13) is more than that as required by the vehicle, the hybrid power driving device works in the over-powered driving mode.

5. The hybrid power driving device of claim 4, wherein, in the hybrid driving mode, the automated mechanical transmission is configured to work with a low speed gear with a high torque, a normal low speed gear, a high speed gear and an over speed gear, when the automated mechanical transmission works in the low speed gear with a high torque, the second synchronizer (10) is locked with the fourth gear wheel (11) so that the fourth gear wheel (11) is fixedly connected with the first input transmission shaft (9) and the third gear wheel (8) rotates freely; the first synchronizer (4) is locked with the first gear wheel (3) so that the first gear wheel (3) is fixedly connected with the output transmission shaft (18); and the clutch (17) is in its disengaged state so that the sixth gear wheel (16) rotates freely; at this time, the route of power transmission is that: the power outputted from the engine (13) is passed through the torsion damper (12), the first input transmission shaft (9), the second synchronizer (10), the fourth gear wheel (11), the fifth gear wheel (14), the second input transmission shaft (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2); while the power outputted from the electric motor (7) is passed through the second input transmission shaft (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2);

when the automated mechanical transmission works in the normal low speed gear, the second synchronizer (10) is locked with the third gear wheel (8) so that the third gear wheel (8) is fixedly connected with the first input transmission shaft (9) and the fourth gear wheel (11) rotates freely; the first synchronizer (4) is locked with the first gear wheel (3) so that the first gear wheel (3) is fixedly connected with the output transmission shaft (18); and the clutch (17) works in its disengaged state and the sixth gear wheel (16) rotates freely; at this time, the route of power transmission is that: the power outputted from the engine (13) is passed through the torsion damper (12), the first input transmission shaft (9), the second synchronizer (10), the third gear wheel (8), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2); while the power outputted from the electric motor (7) is passed through the second input transmission input (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2);

when the automated mechanical transmission works in the high speed gear, the second synchronizer (10) is locked with the fourth gear wheel (11) so that the fourth gear wheel (11) is fixedly connected with the first input transmission shaft (9) and the third gear wheel (8) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power outputted from the engine (13) is passed through the torsion damper (12), the first input transmission shaft (9), the second synchronizer (10), the fourth gear wheel (11), the fifth gear wheel (14), the sixth gear wheel (16), the clutch (17), the output transmission shaft (18), the driving gear wheel (5) of the main reducer, the driven gear wheel (1) of the main reducer, and the differential mechanism (19), to the half axle (2); while the power outputted from the electric motor (7) is passed through the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential mechanism (19), to the half axle (2);

when the automated mechanical transmission works in the over speed gear, the second synchronizer (10) is locked with the third gear wheel (8) so that the third gear wheel (8) is fixedly connected with the first input transmission shaft (9) and the fourth gear wheel (11) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power outputted from the engine (13) is passed through the torsion damper (12), the first input transmission shaft (9), the second synchronizer (10), the third gear wheel (8), the second gear wheel (6), the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential (19), to the half axle (2); while the power outputted from the electric motor (7) is passed through the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential (19), to the half axle (2).

6. The hybrid power driving device of claim 4, wherein, in the over-powered driving mode, the automated mechanical transmission is configured to work with a low speed gear with a high torque, a normal low speed gear, a high speed gear and an over speed gear, when the automated mechanical transmission works in the low speed with a high torque, the second synchronizer (10) is locked with the fourth gear wheel (11) so that the fourth gear wheel (11) is fixedly connected with the first input transmission shaft (9) and the third gear wheel (8) rotates freely; the first synchronizer (4) is locked with the first gear wheel (3) so that the first gear wheel (3) is fixedly connected with the output transmission shaft (18); and the clutch (17) is in its disengaged state so that the sixth gear wheel (16) rotates freely; at this time, the route of power transmission is that: the power is outputted from the engine (13) and is passed through the torsion damper (12), the first input transmission shaft (9), the second synchronizer (10), the fourth gear wheel (11), and the fifth gear wheel (14), to the second input transmission shaft (15); a part of the power is used for driving the vehicle and is outputted to the half axle (2) through the second gear wheel (6), the first gear wheel (3), the first synchronizer (4), the output transmission shaft (18), the driving gear wheel (5) of the main reducer, the driven gear wheel (1) of the main reducer, and the differential (19); and the remaining power flows into the electric motor (7) through the second input transmission shaft (15) to drive the motor (7) to generate electricity;

when the automated mechanical transmission works in the normal low speed gear, the second synchronizer (10) is locked with the third gear wheel (8) so that the third gear wheel (8) is fixedly connected with the first input transmission shaft (9) and the fourth gear wheel (11) rotates freely; the first synchronizer (4) is locked with the first gear wheel (3) so that the first gear wheel (3) is fixedly connected with the output transmission shaft (18); and the clutch (17) is in its disengaged state so that the sixth gear wheel (16) rotates freely; at this time, the route of power transmission is that: the power is outputted from the engine (13) and passed through the torsion damper (12), the first input transmission shaft (9), the second synchronizer (10), and the third gear wheel (8), to the second gear wheel (6); a part of the power outputted from the engine (13) is used for driving the vehicle and is outputted to the half axle (2) through the second gear wheel (6), the first gear wheel (3), the first synchronizer (4), the output transmission shaft (18), the driving gear wheel (5) of the main reducer, the driven gear wheel (1) of the main reducer, and the differential (19); and the remaining power flows into the electric motor (7) through the second gear wheel (6) and the second input transmission shaft (15), to drive the motor (7) to generate electricity;

when the automated mechanical transmission works in the high speed gear, the second synchronizer (10) is locked with the fourth gear wheel (11) so that the fourth gear wheel (11) is fixedly connected with the first input transmission shaft (9) and the third gear wheel (8) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power is outputted from the engine (13) and passed through the torsion damper (12), the first input transmission shaft (9), the second synchronizer (10), and the fourth gear wheel (11), to the fifth gear wheel (14); a part of the power outputted from the engine (13) is used for driving the vehicle and is outputted to the half axle (2) through the fifth gear wheel (14), the sixth gear wheel (16), the clutch (17), transmission the output shaft (18), the driving gear wheel (5) of the main reducer, the driven gear wheel (1) of the main reducer, and the differential (19); and the remaining power flows into the electric motor (7) through the fifth gear wheel (14) and the second input transmission shaft (15), to drive the motor (7) to generate electricity;

when the automated mechanical transmission works in an over speed gear, the second synchronizer (10) is locked with the third gear wheel (8), so that the third gear wheel (8) is fixedly connected with the first input transmission shaft (9) and the fourth gear wheel (11) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power is outputted from the engine (13) and passed through the torsion damper (12), the first input transmission shaft (9), the second synchronizer (10), the third gear wheel (8), the second gear wheel (6), to the second input transmission shaft (15); a part of the power outputted from the engine (13) is used for driving the vehicle and outputted to the half axle (2) through the fifth gear wheel (14), the sixth gear wheel (16), the clutch (17), the output transmission shaft (18), the driving gear wheel (5) of the main reducer, the driven gear wheel (1) of the main reducer, and the differential (19); and the remaining power flows into the electric motor (7) through the second input transmission shaft (15), to drive the motor (7) to generate electricity.

7. The hybrid power driving device of claim 1, wherein, in the braking mode, the second synchronizer (10) is controlled to stay at its neutral position, the first synchronizer (4) is locked with the first gear wheel (3) and the clutch (17) is in its disengaged state, the route of power transmission is that: power is transmitted to the half axle (2) from vehicle wheels, and further to the electric motor (7) through the differential (19), the driven gear wheel (1) of the main reducer, the driving gear wheel (5) of the main reducer, the output transmission shaft (18), the first synchronizer (4), the first gear wheel (3), the second gear wheel (6), and the second input transmission shaft (15), to drive the motor (7) to generate electricity, to charge the battery; the gear ratio between the second gear wheel (6) and the first gear wheel (3) makes better use of the drag torque of the electric motor (7) to enhance a braking effect.

8. The hybrid power driving device of claim 1, wherein, in the coasting mode without power, the first synchronizer (4) is separated from the first gear wheel (3) and the clutch (17) is engaged, the route of power transmission is that: power is transmitted to the half axle (2) from vehicle wheels, and further to the electric motor (7) through the differential (19), the driven gear wheel (1) of the main reducer, the driving gear wheel (5) of the main reducer, the output transmission shaft (18), the clutch (17), the sixth gear wheel (16), the fifth gear wheel (14), and the second input transmission shaft (15), to drive the motor (7) to generate electricity; and the gear ratio between the fifth gear wheel (14) and the sixth gear wheel (16) reduces the influence of the drag torque of the motor (7) on the coasting, to make the vehicle coast a longer distance.

9. A method of controlling a hybrid power driving device for a vehicle, wherein,
the hybrid power driving device for a vehicle comprises an engine (13), an electric motor (7), an automated mechanical transmission, a clutch (17), a main reducer and a differential (19), wherein,
the automated mechanical transmission comprises a first gear wheel (3), a second gear wheel (6), a third gear wheel (8), a fourth gear wheel (11), a fifth gear wheel (14), a sixth gear wheel (16), a first synchronizer (4), a second synchronizer (10), a first input transmission shaft (9) connected with the engine (13), a second input transmission shaft (15) connected with the motor (7), and an output transmission shaft (18), wherein the first and second gear wheels (3, 6) form a pair of meshing gear wheels, the second and third gear wheels (6, 8) form a pair of meshing gear wheels, the fourth and fifth gear wheels (11, 14) form a pair of meshing gear wheels, and the fifth and sixth gear wheels (14, 16) form a pair of meshing gear wheels, both the second and fifth gear wheels (6, 14) are centrally passed through by and fixed to the second input transmission shaft (15), both the third and fourth gear wheels (8, 11) are centrally passed through by and slidable longitudinally on the first input transmission shaft (9), and both the first and sixth gear wheels (3, 16) are centrally passed through by and slidable longitudinally on the output transmission shaft (18); the third and fourth gear wheels (8, 11) are rotatable freely relative to the first input transmission shaft (9), and the first and sixth gear wheels (3, 16) are rotatable freely relative to the output transmission shaft (18); a flywheel of the engine (13) is connected with the first input transmission shaft (9) by a torsion damper (12), and an output shaft of the electric motor (7) is connected with the second input transmission shaft (15);

the main reducer is formed by a driving gear wheel (5) and a driven gear wheel (1), and is connected with the differential (19);

the first synchronizer (4) is configured to control the output transmission shaft (18) and the first gear wheel (3) to be engaged with or separated from each other, the second synchronizer (10) is configured to control the first input transmission shaft (9) and the third or fourth gear wheel (8, 11) to be engaged with or separated from each other, and the clutch (17) is configured to control the sixth gear wheel (16) and the output transmission shaft (18) to be engaged with or separated from each other;

wherein the method comprises: controlling the first synchronizer (4), the second synchronizer (10) and/or the clutch (17) to be engaged with or separated from their corresponding gear wheels, to operate the hybrid power driving device in a pure electric driving mode, a hybrid driving mode, a braking mode, or a coasting mode without power.

10. The method of claim 9, wherein, in the pure electric driving mode, the automated mechanical transmission operates with two effective gears, i.e. a low speed gear and a high speed gear,
when the automated mechanical transmission operates in the low speed gear, the first synchronizer (4) is engaged with the first gear wheel (3), so that the first gear wheel (3) is fixedly connected with the output transmission shaft (18), at this time, the clutch (17) is in a disengaged state, and the sixth gear wheel (16) rotates freely; the route of power transmission is that: the power is outputted from the electric motor (7), and sequentially passed through the second input transmission shaft (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2);

when the automated mechanical transmission operates in the high speed gear, the first synchronizer (4) is not engaged with the first gear wheel (3) so that the first gear wheel (3) rotates freely, and the clutch (17) is in an engaged state so that the sixth gear wheel (16) is fixedly connected with the output transmission shaft (18), and the route of power transmission is that: the power is outputted from the electric motor (7), and sequentially passed through the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential (19), to the half axle (2).

11. The method of claim 9, wherein, in the hybrid driving mode, if the actual output power of the engine (13) cannot meet the power requirement of the vehicle, the hybrid power driving device works in an underpowered driving mode; and if the power provided by the engine (13) is more than that as required by the vehicle, the hybrid power driving device works in the over-powered driving mode.

12. The method of claim 11, wherein, in the hybrid driving mode, the automated mechanical transmission works with a low speed gear with a high torque, a normal low speed gear, a high speed gear and an over speed gear, when the automated mechanical transmission works in the low speed gear with a high torque, the second synchronizer (10) is locked with the fourth gear wheel (11) so that the fourth gear wheel (11) is fixedly connected with the first input transmission shaft (9) and the third gear wheel (8) rotates freely; the first synchronizer (4) is locked with the first gear wheel (3) so that the first gear wheel (3) is fixedly connected with the output transmission shaft (18); and the clutch (17) is in its disengaged state so that the sixth gear wheel (16) rotates freely; at this time, the route of power transmission is that: the power outputted from the engine (13) is passed through the torsion damper (12), the first input transmission shaft (9), the second synchronizer (10), the fourth gear wheel (11), the fifth gear wheel (14), the second input transmission shaft (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2); while the power outputted from the electric motor (7) is passed through the second input transmission shaft (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2);

when the automated mechanical transmission works in the normal low speed gear, the second synchronizer (10) is locked with the third gear wheel (8) so that the third gear wheel (8) is fixedly connected with the first input transmission shaft (9) and the fourth gear wheel (11) rotates freely; the first synchronizer (4) is locked with the first gear wheel (3) so that the first gear wheel (3) is fixedly connected with the output transmission shaft (18); and the clutch (17) works in its disengaged state and the sixth gear wheel (16) rotates freely; at this time, the route of power transmission is that: the power outputted from the engine (13) is passed through the torsion damper (12), the first input transmission shaft (9), the second synchronizer (10), the third gear wheel (8), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2); while the power outputted from the electric motor (7) is passed through the second input transmission input (15), the second gear wheel (6), the first gear wheel (3), the first synchronizer (4), the output transmission shaft (18), the driving gear wheel (5) of the main reducer, the driven gear wheel (1) of the main reducer, and the differential (19), to the half axle (2);

when the automated mechanical transmission works in the high speed gear, the second synchronizer (10) is locked with the fourth gear wheel (11) so that the fourth gear wheel (11) is fixedly connected with the first input transmission shaft (9) and the third gear wheel (8) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power outputted from the engine (13) is passed through the torsion damper (12), the first input transmission shaft (9), the second synchronizer (10), the fourth gear wheel (11), the fifth gear wheel (14), the sixth gear wheel (16), the clutch (17), the output transmission shaft (18), the driving gear wheel (5) of the main reducer, the driven gear wheel (1) of the main reducer, and the differential mechanism (19), to the half axle (2); while the power outputted from the electric motor (7) is passed through the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential mechanism (19), to the half axle (2);

when the automated mechanical transmission works in the over speed gear, the second synchronizer (10) is locked with the third gear wheel (8) so that the third gear wheel (8) is fixedly connected with the first input transmission shaft (9) and the fourth gear wheel (11) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power outputted from the engine (13) is passed through the torsion damper (12), the first input transmission shaft (9), the second synchronizer (10), the third gear wheel (8), the second gear wheel (6), the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential (19), to the half axle (2); while the power outputted from the electric motor (7) is passed through the second input transmission shaft (15), the fifth gear wheel (14), the sixth gear wheel (16), the clutch (17), the output transmission shaft (18), the driving gear wheel (5) of the main reducer, the driven gear wheel (1) of the main reducer, and the differential (19), to the half axle (2).

13. The method of claim 11, wherein, in the over-powered driving mode, the automated mechanical transmission works with a low speed gear with a high torque, a normal low speed gear, a high speed gear and an over speed gear, when the automated mechanical transmission works in the low speed with a high torque, the second synchronizer (10) is locked with the fourth gear wheel (11) so that the fourth gear wheel (11) is fixedly connected with the first input transmission shaft (9) and the third gear wheel (8) rotates freely; the first synchronizer (4) is locked with the first gear wheel (3) so that the first gear wheel (3) is fixedly connected with the output transmission shaft (18); and the clutch (17) is in its disengaged state so that the sixth gear wheel (16) rotates freely; at this time, the route of power transmission is that: the power is outputted from the engine (13) and is passed through the torsion damper (12), the first input transmission shaft (9), the second synchronizer (10), the fourth gear wheel (11), and the fifth gear wheel (14), to the second input transmission shaft (15); a part of the power is used for driving the vehicle and is outputted to the half axle (2) through the second gear wheel (6), the first gear wheel (3), the first synchronizer (4), the output transmission shaft (18), the driving gear wheel (5) of the main reducer, the driven gear wheel (1) of the main reducer, and the differential (19); and the remaining power flows into the electric motor (7) through the second input transmission shaft (15) to drive the motor (7) to generate electricity;

when the automated mechanical transmission works in the normal low speed gear, the second synchronizer (10) is locked with the third gear wheel (8) so that the third gear wheel (8) is fixedly connected with the first input transmission shaft (9) and the fourth gear wheel (11) rotates freely; the first synchronizer (4) is locked with the first gear wheel (3) so that the first gear wheel (3) is fixedly connected with the output transmission shaft (18); and the clutch (17) is in its disengaged state so that the sixth gear wheel (16) rotates freely; at this time, the route of power transmission is that: the power is outputted from the engine (13) and passed through the torsion damper (12), the first input transmission shaft (9), the second synchronizer (10), and the third gear wheel (8), to the second gear wheel (6); a part of the power outputted from the engine (13) is used for driving the vehicle and is outputted to the half axle (2) through the second gear wheel (6), the first gear wheel (3), the first synchronizer (4), the output transmission shaft (18), the driving gear wheel (5) of the main reducer, the driven gear wheel (1) of the main reducer, and the differential (19); and the remaining power flows into the electric motor (7) through the second gear wheel (6) and the second input transmission shaft (15), to drive the motor (7) to generate electricity;

when the automated mechanical transmission works in the high speed gear, the second synchronizer (10) is locked with the fourth gear wheel (11) so that the fourth gear wheel (11) is fixedly connected with the first input transmission shaft (9) and the third gear wheel (8) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power is outputted from the engine (13) and passed through the torsion damper (12), the first input transmission shaft (9), the second synchronizer (10), and the fourth gear wheel (11), to the fifth gear wheel (14); a part of the power outputted from the engine (13) is used for driving the vehicle and is outputted to the half axle (2) through the fifth gear wheel (14), the sixth gear wheel (16), the clutch (17), transmission the output shaft (18), the driving gear wheel (5) of the main reducer, the driven gear wheel (1) of the main reducer, and the differential (19); and the remaining power flows into the electric motor (7) through the fifth gear wheel (14) and the second input transmission shaft (15), to drive the motor (7) to generate electricity;

when the automated mechanical transmission works in an over speed gear, the second synchronizer (10) is locked with the third gear wheel (8), so that the third gear wheel (8) is fixedly connected with the first input transmission shaft (9) and the fourth gear wheel (11) rotates freely; the first synchronizer (4) is disengaged with the first gear wheel (3) so that the first gear wheel (3) rotates freely; and the clutch (17) is in its engaged state so that the sixth gear wheel (16) is fixedly connected with the output transmission shaft (18); at this time, the route of power transmission is that: the power is outputted from the engine (13) and passed through the torsion damper (12), the first input transmission shaft (9), the second synchronizer (10), the third gear wheel (8), the second gear wheel (6), to the second input transmission shaft (15); a part of the power outputted from the engine (13) is used for driving the vehicle and outputted to the half axle (2) through the fifth gear wheel (14), the sixth gear wheel (16), the clutch (17), the output transmission shaft (18), the driving gear wheel (5) of the main reducer, the driven gear wheel (1) of the main reducer, and the differential (19); and the remaining power flows into the electric motor (7) through the second input transmission shaft (15), to drive the motor (7) to generate electricity.

14. The method of claim 9, wherein, in the braking mode, the second synchronizer (10) is controlled to stay at its neutral position, the first synchronizer (4) is locked with the first gear wheel (3) and the clutch (17) is in its disengaged state, the route of power transmission is that: power is transmitted to the half axle (2) from vehicle wheels, and further to the electric motor (7) through the differential (19), the driven gear wheel (1) of the main reducer, the driving gear wheel (5) of the main reducer, the output transmission shaft (18), the first synchronizer (4), the first gear wheel (3), the second gear wheel (6), and the second input transmission shaft (15), to drive the motor (7) to generate electricity, to charge the battery; the gear ratio between the second gear wheel (6) and the first gear wheel (3) makes better use of the drag torque of the electric motor (7) to enhance a braking effect.

15. The method of claim 9, wherein, in the coasting mode without power, the first synchronizer (4) is separated from the first gear wheel (3) and the clutch (17) is engaged, the route of power transmission is that: power is transmitted to the half axle (2) from vehicle wheels, and further to the electric motor (7) through the differential (19), the driven gear wheel (1) of the main reducer, the driving gear wheel (5) of the main reducer, the output transmission shaft (18), the clutch (17), the sixth gear wheel (16), the fifth gear wheel (14), and the second input transmission shaft (15), to drive the motor (7) to generate electricity; and the gear ratio between the fifth gear wheel (14) and the sixth gear wheel (16) reduces the influence of the drag torque of the motor (7) on the coasting, to make the vehicle coast a longer distance.

16. A hybrid power driving device based on an automated mechanical transmission for a vehicle, comprising an engine (13), an electric motor (7), an automated mechanical transmission, a clutch (17), a main reducer and a differential (19), wherein, the automated mechanical transmission contains a first gear wheel (3), a second gear wheel (6), a third gear wheel (8), a fourth gear wheel (11), a fifth gear wheel (14), a sixth gear wheel (16), a seventh gear wheel (20), an eighth gear wheel (21), a first synchronizer (4), a second synchronizer (10), a first input transmission shaft (9) connected with the engine, a second input transmission shaft (15) connected with the motor, and an output transmission shaft (18), wherein the first and second gear wheels (3, 6) form a pair of meshing gear wheels, the second and third gear wheels (6, 8) form a pair of meshing gear wheels, the fourth and fifth gear wheels (11, 14) form a pair of meshing gear wheels, the fifth and sixth gear wheels (14, 16) form a pair of meshing gear wheels, and the seventh and eighth gear wheels (20, 21) form a pair of meshing gear wheels;

the second, fifth and seventh gear wheels (6, 14, 20) are centrally passed through by and fixed to the second input transmission shaft (15), both the third and fourth gear wheels (8, 11) are centrally passed through by and slidable longitudinally on the first input transmission shaft (9), and the first, sixth and eighth gear wheels (3, 16, 21) are centrally passed through by and slidable longitudinally on the output transmission shaft (18), the third and fourth gear wheels (8, 11) are rotatable freely relative to the first input transmission shaft (9), and the first, sixth and eighth gear wheels (3, 16, 21) are rotatable freely relative to the output transmission shaft (18), the flywheel of the engine (13) is connected with the first input transmission shaft (9) by a torsion damper (12), and an output shaft of the electric motor (7) is connected with the second input transmission shaft (15), the main reducer is formed by a driving gear wheel (5) and a driven gear wheel (1), and is connected with the differential (19);

the first synchronizer (4) is configured to control the output transmission shaft (18) and the first and eighth gear wheels (3, 21) to be engaged with or separated from each other, the second synchronizer (10) is configured to control the first input transmission shaft (9) and the third or fourth gear wheel (8, 11) to be engaged with or separated from each other, and the clutch (17) is configured to control the sixth gear wheel (16) and the output transmission shaft (18) to be engaged with or separated from each other.

\* \* \* \* \*